Feb. 14, 1950     S. DAILY     2,497,299

SUPPORTING MEANS FOR MILKING APPARATUS

Filed May 3, 1947

Inventor
Sherwood Daily
By Paul O. Pippel
atty.

Patented Feb. 14, 1950

2,497,299

UNITED STATES PATENT OFFICE 2,497,299

SUPPORTING MEANS FOR MILKING APPARATUS

Sherwood Daily, Downers Grove, Ill., assignor to International Harvester Company, a corporation of New Jersey Application May 3, 1947, Serial No. 745,682

5 Claims. (Cl. 31—58)

This invention relates to milking machines. More specifically, it concerns milking machines of a type which is positioned underneath the cow's body and wherein the milk receiving receptacle is partially supported from the teats of the cow by means of relatively short flexible milk tubes.

It has generally been found in suction type milkers that there is ever present the danger of teat strangulation. During the final stages of milking, there is a tendency on the part of the teat cups to be drawn upwardly on the teats, thereby pinching the soft membranes of the udder and shutting off the flow of milk therefrom. This many times causes damage to the cow's udder and results in a subsequent decrease in milk production. In order to overcome this difficulty a suspension type of milker has previously been designed. Milking apparatus of the suspension type includes a milk receiving receptacle which is suspended from the back of the cow by means of a flexible band or hanger member. The receptacle is connected to the hanger at one point underneath the cow and is also partially supported from the teats of the cow by means of short flexible tubes connected to the teat cups and to the receptacle. As the milking operation progresses, with this type of milker, the milk accumulates in the receptacle and the increased weight therein progressively causes the teat cups to exert a heavier tugging action or pull on the teats of the cow. Thus the upward "climbing" of the teat cups is prevented, the increased weight within the receptacle being effective at a time when the teat strangulation would most likely occur; namely, toward the end of the operation.

The hanger type of milker was found to solve the problem of "teat strangulation" but instead it created new undesirable problems. It was found extremely awkward to place the hanger on the cow and more so to keep it there during the milking operation. Considerable time had to be spent by the dairy man in making the necessary variable adjustment of the hanger for each individual cow. The time spent in cleaning the hanger also is considered quite substantial. A flexible type hanger would absorb body grease from the cow and would become difficult to clean. On the other hand, a metal type hanger would tend to bruise the cow's back after a certain period of use.

It is the prime object of this invention therefore to provide an improved means for supporting a milking apparatus of the type which is partially supported from the cow's teats by short flexible milk tubes.

It is another object to provide an improved milking apparatus having a milk receiving receptacle which is supported in a manner whereby a straight downward tugging action results upon the teats of the cow, said tugging action becoming increasingly greater due to the greater accumulation of milk and thereby preventing strangulation of the cow's teats.

Another object is to provide an improved supporting device for a milking apparatus, said supporting device including a ground support which is connected to the milk receiving receptacle.

Still another object is to provide a portable ground support for a short tube milking apparatus, the milk receiving receptacle being pivotally connected to said ground support for vertical hinged movement with respect thereto.

Another object is to provide a ground support for a short tube milking apparatus, said ground support being adapted to resiliently support the milk receiving receptacle underneath the cow's body.

Another object is to provide a resilient ground supporting device for a milk receiving receptacle, said receptacle being connected to the cow's teats and to the supporting device, said resilient construction providing means whereby said receptacle is free to resiliently sag vertically downwardly under the accumulation of milk, thereby providing a vertical tugging action on the cow's teats.

Other objects of this invention will become apparent as the description proceeds.

In the drawings, Fig. 1 is a side elevational view of an improved milking apparatus showing its application and position with respect to a cow;

Figure 1:
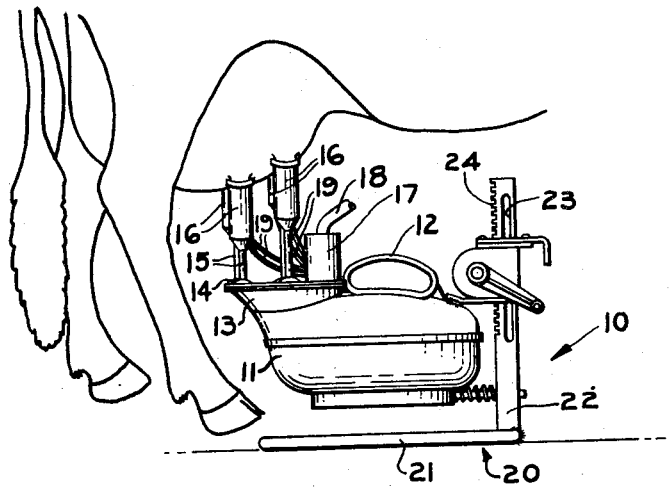
Figure 2:
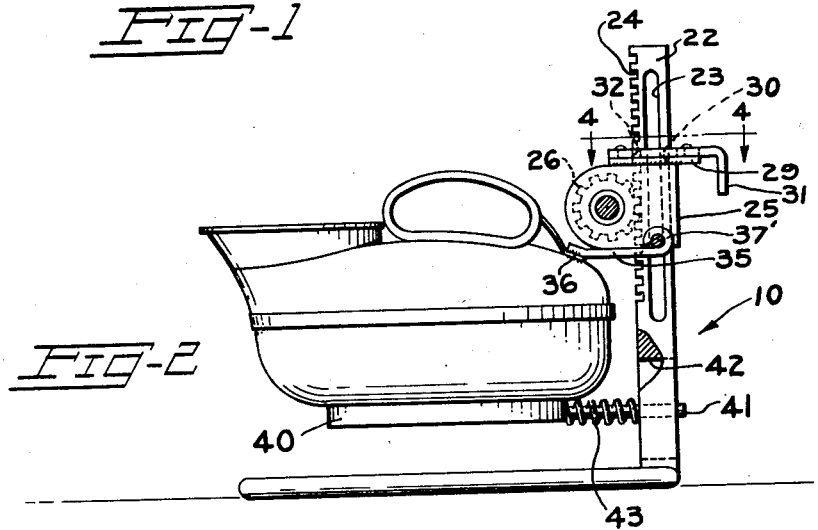
Fig. 2 is an enlarged side elevational view of a milking apparatus, said view showing a milk receiving receptacle carried by a ground support.
Figure 3:
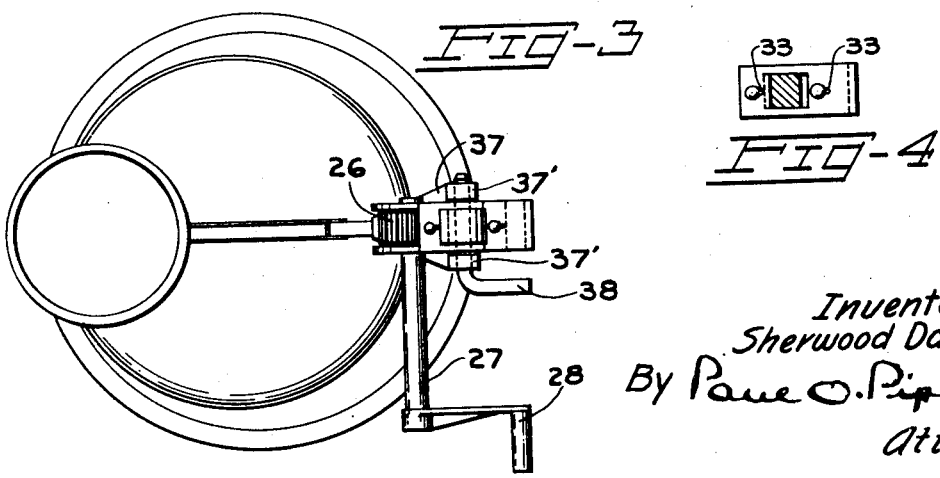
Fig. 3 is a plan view of the same.
Figure 4:
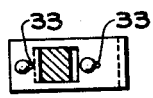
Fig. 4 is a sectional view taken along the line 4—4 of Fig. 2.

Referring particularly to Figs. 1 and 2, a milking apparatus is generally indicated by the reference character 10. The milking apparatus 10 consists of a milk receiving receptacle 11 which may be of any suitable bucket type construction. The milk receiving receptacle is provided with a handle 12 and a spout 13. A cover or closure plate 14 is provided over the spout 13. The cover or closure plate 14 has connected thereto to plurality of short flexible milk tubes 15 which are in turn connected to and are in communication with a plurality of teat cups 16. A pulsating device 17 is secured to the closure plate 14. The pulsator 17 is in communication with a source of vacuum, not shown, by means of a flexible conduit or vacuum line 18. Vacuum tubes 19 are connected to the pulsator at one end and are in communication with the teat cups 16. The teat cups 16 are of a conventional double chambered construction which are well known in the art. Further description with respect to these is not deemed essential.

The milk receiving receptacle 11 is supported underneath the body of the cow by means of a portable ground support generally designated by the reference character 20. The ground support comprises an annular tubular element, or ring, 21 which is longitudinally supported on the ground. Connected to the ring 21 and extending vertically with respect thereto is an upright member or standard 22. The upright member 22 is provided with a vertically and transversely extending slot 23 and a plurality of rack teeth 24.

An adjustable channel shaped member 25 is slidably connected to the upright member 22. Between the legs of the channel shaped member 25 there is provided a pinion 26 which is rigid with respect to a transversely extending shaft 27 which is journaled on the adjustable member 25. The pinion 26 is positioned to engage the rack teeth 24 of the upright member 22. By means of a handle member 28 the shaft 27 may be rotated and the pinion may be moved thereby adjusting the adjustable member 25 to the vertical height desired. A plate 29 is rigidly secured to the upper portion of the adjustable member 25. The plate 29 is provided with a rectangular opening 30 through which the upright member 22 extends. A longitudinally movable latch 31 is positioned on top of the plate 30. The adjustable latch 31 includes an opening 32 through which the upright member 24 extends. Longitudinally extending slots 33 are provided in the latch 31. The latch 31 is secured to the plate 29 by means of rivets or other suitable fasteners extending through the slots 33. The longitudinal slots 33 permit a sufficient longitudinal movement so that the latch 31 can be longitudinally shifted.

A bail shaped hinge member 35 is rigidly secured to the upper portion of the receptacle 11 as indicated at 36. The bail shaped hinge member is provided with longitudinally extending leg portions 37 having bent over ends 37' which straddle the upright member 22. A removable hinge pin 38 extends through the ends 37' and through the slot 23 of the upright member 22. The receptacle 11 is pivotally supported by the hinge pin 38 on the adjustable member 25 since the pin 38 extends through the member 25 and is movable therewith. The standard 22 thus supports the receptacle 11 by means of the adjustable member 25.

The lower portion of the receptacle 11 is provided with shoulder member 40. Connected to this shoulder member 40 is a longitudinally extending pin 41. The pin 41 extends forwardly through a longitudinally extending slot 42 provided in the upright member 22. A resilient element, such as a coil spring 43, is provided around the pin 41. The coil spring 43 bears against the rearward side of the lower portion of the member 22 and resiliently supports the milk receiving receptacle 11 in a substantially horizontal position.

The milk container is placed underneath the cow as best shown in Fig. 1. The teat cups are attached to the teats of the cow and any desired vertical adjustment is made by turning the handle 28 in a clockwise or counterclockwise manner until the milk receiving receptacle is at a suitable height. Forward sliding movement of the latch 31 locks the adjustable member 25 against further vertical movement. The pulsator is set into motion in a conventional manner whereupon the milking process begins. Since the milk receiving receptacle is resiliently pivotally supported, the intermittent tugging action of the teat cups causes rhythmic vertical movement of the receptacle. The milk accumulates within the receptacle and causes a vertical downward tug on the teats, thereby preventing the teat cups from crawling upwardly and thus causing possible teat strangulation. As the milking progresses and the probability of teat strangulation becomes more likely, this probability is counteracted by the increased quantity of milk within the receptacle which causes the same to sag vertically downwardly, the increased weight thereby progressively increasing the tug on the teats. It is especially important to note that a vertical downward pull is provided thus subjecting the cow to a most natural milking action.

The resilient effect of the coil spring 43 is, of course, dependent on its size. The vertical resilient movement of the milk receiving receptacle can thus be controlled by changing the spring to the size desired. Should, at any time, the teat cups become accidentally separated from the teats of the cow, the milk receiving receptacle will merely sag downwardly to its maximum position and the teat cups will remain suspended above the floor. This is of prime importance since the teat cups thereby are less likely to become contaminated than they would be if they were free to fall on the floor of the dairy stall. In order to remove the receptacle from the ground support the operator merely slides out the pin 38.

It can thus be seen that a novel supporting device has been provided for an improved milking apparatus and it is to be understood that changes and modifications may be made in this construction which do not depart from the spirit of the invention as disclosed nor the scope thereof as defined in the appended claims.

What is claimed is:

1. In a milking machine having a milk receiving receptacle and a plurality of teat cups connected to said receptacle by relatively short flexible milk tubes, the combination therewith of means for supporting said receptacle beneath the animal's body including a ground support having an upright member connected thereto, a member slidably associated with said upright member, rack and pinion means between said upright member and said supporting member for vertically adjusting the sliding member, a hinge member connected to said receptacle, said hinge member being pivotally connected to the sliding member for hinged movement about a horizontal axis, a resilient element positioned between said upright member and said receptacle, said hinge member and said resilient member providing two points of support for said receptacle thereby resiliently supporting the receptacle in a substantially horizontal position, said receptacle being adapted to sag vertically downwardly under the increasing accumulation of milk, thereby providing a downward vertical tug on the teats of the animal.

2. In a milking machine having a milk receiving receptacle and a plurality of teat cups connected to the receptacle by relatively short flexible milk tubes, the combination therewith of means for supporting the receptacle beneath the animal's body including a ground support having an upright member adapted to be positioned under the animal's body, an adjustable member connected to said upright member in sliding relation, means for adjusting said adjustable member on said upright member, a hinge bracket connected to said receptacle adjacent the upper edge thereof, means hingedly connecting said bracket to said upright member for pivotal movement about a horizontal axis, a resilient member connected to said receptacle, said resilient member being engageable with said upright member for resiliently supporting said receptacle, said receptacle being held by said resilient member in a substantially horizontal position until the receptacle sags downwardly against the action of said resilient member under the increasing accumulation of milk in the receptacle thereby providing a downward vertical tug on the teats of the animal.

3. In a milking machine having a milk receiving receptacle and a plurality of teat cups connected to the receptacle by relatively short flexible milk tubes, the combination therewith of means for supporting the receptacle independently of the animal including a portable ground support having an upright member adapted to be positioned underneath the animal's body, a supporting member adjustably connected to the upright member, means for supporting said receptacle resiliently in a substantially horizontal position including a hinge bracket connected between said receptacle and said supporting member to provide for hinged movement of said receptacle about a horizontal axis, a spring connected to said receptacle, said spring extending substantially parallel to said hinge bracket and engaging said upright member, said receptacle being arranged and constructed to pivot with respect to said supporting member and sag under the increasing accumulation of milk, thereby compressing said spring and providing a downward vertical tug on the teats of the animal.

4. In a milking machine having a milk-receiving receptacle and a plurality of teat cups connected to the receptacle by relatively short flexible milk tubes, the combination therewith of a portable ground support having an upright member adapted to be positioned underneath the animal's body, a supporting member adjustable vertically on said upright member, a hinge bracket rigidly connected to the milk-receiving receptacle, means pivotally connecting said hinge bracket to said upright member, said means including a quickly detachable hinge pin, a spring engaging said receptacle and said upright member, means supporting said spring in vertically spaced and parallel relation with respect to said hinge bracket, said spring and hinge bracket providing two points of support for resiliently supporting said receptacle in a substantially horizontal position, said receptacle being arranged and constructed to pivot with respect to said supporting member and sag under the increasing accumulation of milk thereby compressing said spring and providing a downward vertical tug on the teats of the animal.

5. In a milking machine having a milk receiving receptacle and a plurality of teat cups connected to said receptacle by flexible milk tubes, the combination therewith of means for supporting the receptacle beneath and independently of an animal's body including a portable ground support having an upright member connected thereto, means pivotally connecting said receptacle to said upright member for hinged movement about a horizontal axis, a spring engageable with said receptacle, said spring and said pivotal connecting means providing two points of support for resiliently supporting said receptacle in a substantially horizontal position, said receptacle being arranged and constructed to pivot with respect to said supporting member and to sag under the increasing accumulation of milk against the resilient supporting action of said spring thereby providing a downward vertical tug on the teats of the animal.

SHERWOOD DAILY.

REFERENCES CITED

The following references are of record in the file of this patent:

UNITED STATES PATENTS

| Number | Name | Date |
|---|---|---|
| Re. 22,368 | Babson et al. | Aug. 24, 1943 |
| 142,247 | Lincoln | Aug. 26, 1873 |
| 1,859,213 | McCornack | May 17, 1932 |

FOREIGN PATENTS

| Number | Country | Date |
|---|---|---|
| 5,233 | Australia | Dec. 16, 1926 |